United States Patent
Patzer

(10) Patent No.: US 12,240,540 B2
(45) Date of Patent: Mar. 4, 2025

(54) SYSTEM AND METHOD FOR STEERING TRAILER COUPLED TO FIFTH WHEEL OF MOTOR VEHICLE

(71) Applicants: Hyundai Motor Company, Seoul (KR); Kia Corporation, Seoul (KR)

(72) Inventor: Thomas Patzer, Mainz (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 718 days.

(21) Appl. No.: 17/512,192

(22) Filed: Oct. 27, 2021

(65) Prior Publication Data

US 2023/0013477 A1 Jan. 19, 2023

(30) Foreign Application Priority Data

Jul. 13, 2021 (DE) .......................... 102021207439.1

(51) Int. Cl.
*B62D 53/08* (2006.01)
(52) U.S. Cl.
CPC ................................ *B62D 53/0814* (2013.01)
(58) Field of Classification Search
CPC .................................................. B62D 53/0814
See application file for complete search history.

(56) References Cited

U.S. PATENT DOCUMENTS

| | | | | |
|---|---|---|---|---|
| 2,979,341 A | * | 4/1961 | Thomas | B62D 53/0814 280/468 |
| 3,172,685 A | * | 3/1965 | Mandekic | B62D 13/005 280/412 |
| 4,391,455 A | * | 7/1983 | Fagerstedt | B62D 49/007 280/438.1 |
| 4,729,575 A | * | 3/1988 | Eggen | B62D 53/0814 280/468 |
| 8,333,399 B2 | | 12/2012 | Brown et al. | |
| 2020/0164935 A1 | * | 5/2020 | Newton | B62D 49/007 |

* cited by examiner

*Primary Examiner* — Anne Marie M Boehler
*Assistant Examiner* — Hosam Shabara
(74) *Attorney, Agent, or Firm* — Fox Rothschild LLP

(57) ABSTRACT

A system and method for steering a trailer include the trailer being coupled to a fifth wheel of a motor vehicle. A trailer steering system for the motor vehicle includes a sliding rail mounted on a vehicle frame of the motor vehicle and extending along a lateral direction of the motor vehicle, a slider slidingly arranged on the sliding rail and carrying the fifth wheel for coupling the trailer to the motor vehicle, and a control device configured to control movement of the slider along the sliding rail depending on a current steering angle of the motor vehicle.

19 Claims, 3 Drawing Sheets

SYSTEM AND METHOD FOR STEERING TRAILER COUPLED TO FIFTH WHEEL OF MOTOR VEHICLE

CROSS-REFERENCE TO RELATED APPLICATION

This application claims under 35 U.S.C. § 119 the benefit of German Patent Application No. 102021207439.1 filed on Jul. 13, 2021, the entire contents of which are incorporated herein by reference.

BACKGROUND

(a) Technical Field

The present disclosure relates to a trailer steering system for a motor vehicle, a motor vehicle with such a trailer steering system, and a method for steering a trailer coupled to a fifth wheel of the motor vehicle.

(b) Description of the Related Art

In order for motor vehicles to be imported to and/or sold in certain regions or countries, they typically must be compliant with respective regulations relating to vehicle design and specifications. Approval and homologation requirements may be defined for various vehicle categories such as passenger cars, buses, motorcycles, trucks, trailers and/or other commercial vehicles. For example, a German regulation on operation of transport companies in public transport (BOKraft) regulates the operation of transport companies and defines among others minimum requirements regarding equipment and conditions for motor vehicles. Due to these regulations, it is necessary for the homologation of heavy-duty vehicles to comply with certain limitations on the size of their turning circle (also called turning diameter or turning radius). In particular, vehicles performing circular travel are required to stay in a cylindrical envelope without exceeding the borderlines of the envelope. For example, a truck and/or tractor unit towing a semi-trailer (referred to as a semi-trailer truck herein) may have to stay in a cylindrical envelope between an inner radius of 5.3 m and an outer radius of 12.5 m.

For eco-friendly vehicles, an extension of a semi-trailer truck up to approximately 800 mm is allowed in Europe. The additional space could be used for various purposes, e.g., as storage extension at a rear of the truck or tractor. However, the vehicle would still have to pass the turning cycle test despite the length increase, which may be difficult if the vehicle tows a standardized trailer, e.g., a European Standard Trailer (EST).

U.S. Pat. No. 8,333,399 describes a slidably adjustable fifth wheel hitch assembly for a vehicle and control system for the same, where a fifth wheel is adjustable in a longitudinal direction of the vehicle so as to improve length and axial load optimization.

It would be desirable to find solutions that enable greater lengths of vehicles towing trailers without increasing turning radii.

SUMMARY

The present disclosure provides a trailer steering system, a motor vehicle, and a method in for steering a trailer coupled to a fifth wheel of the motor vehicle.

According to one aspect of the disclosure, a trailer steering system for a motor vehicle comprises a sliding rail mounted on a vehicle frame of the motor vehicle and extending along a lateral direction of the motor vehicle; a slider slidingly arranged on the sliding rail and carrying a fifth wheel for coupling a trailer to the motor vehicle; and a control device configured to control movement of the slider along the sliding rail depending on a current steering angle of the motor vehicle.

According to another aspect of the disclosure, a motor vehicle comprises a trailer steering system according to the disclosure.

According to yet another aspect of the disclosure, a method is provided for steering a trailer coupled to a fifth wheel of a motor vehicle, wherein the fifth wheel is arranged on top of a slider being slidingly arranged on a sliding rail, the sliding rail being mounted on a vehicle frame of the motor vehicle and extending along a lateral direction of the motor vehicle. The method comprises assessing a current steering angle of the motor vehicle with a control device; and controlling movement of the slider along the sliding rail with the control device depending on a current steering angle of the motor vehicle.

One aspect of the present disclosure is to adjust the alignment between a vehicle and a trailer when driving a curve by moving the position of the fifth wheel laterally, that is, parallel to a rear axis of the vehicle. By shifting the fifth wheel, the whole fifth wheel coupling arrangement including the kingpin of the trailer, i.e. the pin protruding from the trailer and engaging the horseshoe of the fifth wheel at the vehicle, will be dragged along such that the trailer is reoriented with respect to the vehicle depending on the steering angle. Thus, relative position and orientation of a vehicle with respect to a trailer can be continuously adapted, e.g., between a truck and a semi-trailer, which makes it possible to pass a turning circle test even with increased vehicle length. More generally, this coupling may improve maneuvering, particularly under large steering angles, e.g., in narrow areas. Furthermore, usage of the disclosure may be used to optimize load distribution and hence may provide the possibility of an upgrade in payload.

This is achieved by mounting the fifth wheel in a sliding arrangement on a slider at the back of the vehicle, the slider being slidably engaged in a corresponding sliding rail, which may be provided with one or several suitable railways that are engaged by the slider. The slider may then move parallel to a rear axle as defined by an orientation of the sliding rail. In doing so, the sliding rail may transmit any forces from the fifth wheel to the frame and vice versa. Motion of the slider may be supported by any natural movement of the trailer, e.g., due to mass inertia, rolling behavior and/or rolling resistance.

As a result, the disclosure provides extended coupling options for a trailer with an optimized axle load situation. The disclosure thus offers amongst others the opportunity to couple standard trailers with non-standard semi-tractors, in particular such that a turning circle test, as required by the BOKraft, may be passed despite an increased truck length. As further benefits, shunting in narrow areas is made easier and payloads may be increased for a given truck and/or trailer size, in particular by using a larger wheelbase for the vehicle.

According to an embodiment of the disclosure, the sliding rail may be fixedly mounted on the vehicle frame.

Hence, the sliding rail may be mounted on the vehicle frame without any remaining degree of freedom such that forces and moments will be transferred from and to the vehicle frame directly. It is to be understood however that the coupling between sliding rail and vehicle frame may leave one or several degrees of freedom in other embodiments of the disclosure, e.g., to provide more flexibility for coupling a trailer to a vehicle.

According to an embodiment of the disclosure, the slider may be form-fitted to the sliding rail such that relative movement of the slider and the sliding rail is blocked in a longitudinal direction of the vehicle and/or a vertical direction of the vehicle.

Thus, the slider may transmit forces in vertical and/or longitudinal direction as well as rotations around any axis. As a consequence, only forces in lateral direction, i.e. parallel to the axes of the vehicle, will be transferred via the sliding arrangement.

According to an embodiment of the disclosure, the system may further comprise at least one hydraulic cylinder configured to actuate sliding movement of the slider along the sliding rail.

Hence, one or several hydraulic cylinders may be used to drive, lock and/or limit the position of the slider along the sliding rail, wherein hydraulic force is used to actuate movement of the slider along the sliding rail. To this end, the hydraulic cylinders may be controlled by the control device. For example, the control device may control speed and/or position of the slider on basis of appropriate pressure settings. Flow of hydraulic fluid may be adjusted by employing corresponding (check) valves. Sensors may be provided in communication with the control device to determine current pressures in the hydraulic system as well as current position of the slider along the sliding rail. The control device may then take appropriate action based on feedback of the sensors in order to control the hydraulic cylinders and thus the slider in an optimized way.

According to an embodiment of the disclosure, the at least one hydraulic cylinder may be configured as a double-acting hydraulic cylinder.

In contrast to a single acting cylinder, which only extends by pressure from a pump and then retracts by the weight of a load or by an inbuilt spring, a double acting cylinder uses hydraulic power to both extend and retract. To this end, a double acting cylinder requires two ports for the connection of hydraulic hose fittings, one for advance movement and one for retract movement.

In one particular example, two double-acting hydraulic cylinders may be coupled to the sliding rail, one for each lateral side of the rail. Thus, when one cylinder retracts the other advances. A locking of the slider in a center position may be achieved on basis of a residual pressure in both cylinders.

According to an embodiment of the disclosure, the at least one hydraulic cylinder may be mounted on the sliding rail.

Thus, the whole movable fifth wheel arrangement including slider, sliding rail and hydraulic cylinders may be installed and/or replaced as one integrated unit. Also check valves may be integrated together with the hydraulic cylinders as one unit.

According to an embodiment of the disclosure, the system may further comprise at least one screw drive configured to actuate sliding movement of the slider along the sliding rail.

Hence, as an alternative and/or addition to hydraulic cylinders, also a screw-drive mechanism may be employed for the actuation of the slider along the sliding rail, in particular a self-locking screw-driver mechanism. However, a hydraulic layout may provide benefits with regards to movement speed, wear and easier development. It is to be understood however that the person of skill may also conceive other alternative or complementary mechanisms for actuating the slider along the sliding rail.

According to an embodiment of the disclosure, the control device may be configured to prompt movement of the slider in a laterally opposite direction with respect to a current steering direction of the motor vehicle.

For example, when the vehicle steers to the left the fifth wheel may be moved to the right. Accordingly, the fifth wheel may be actuated towards the left when the vehicle makes a right turn. When driving straight ahead, the slider may reside in a centered position.

According to an embodiment of the disclosure, the control device may be configured to block movement of the slider along the sliding rail when the motor vehicle is stationary or when a vehicle speed of the motor vehicle is above a threshold speed.

For example, the fifth wheel may be locked in and/or moved back to a centered position when the speed of the vehicle is above the threshold. Furthermore, parking and other stationary situations (i.e. zero or negligible vehicle speed, e.g., power-take off) may only be allowed in a centered position. In these instances, the slider may also be locked within the centered position. However, there may be exceptions to this, e.g., when the vehicles waits at a traffic light in a curve. In that case the fifth wheel may not be centered but merely locked within the current position along the sliding rail.

The vehicle may be equipped with a warning indicator or warning lamp or the like that indicates a (de)activation and/or malfunction of the system to an operator. Moreover, an emergency locking mechanism may be provided that allows to unlock the fifth wheel in order to manually center it, e.g., as "limp home" function. To this end, the mechanism may open the valves of the hydraulic cylinders of the sliding arrangement, for example. While the emergency locking mechanism is activated, a speed limiter may be set to a very low level, e.g., one or several km/h.

The threshold speed may be, for example, 40 km/h. It is to be understood that different speed thresholds may have advantages depending on the respective application. The chosen limit may depend, for example, on mandatory safety measures and/or requirements with regards to steadiness and robustness.

According to an embodiment of the disclosure, the control device may be configured to calculate and set an optimal sliding position of the slider along the sliding rail depending on geometrical configuration data of the motor vehicle, the vehicle speed of the motor vehicle and/or the current steering angle of the motor vehicle.

The control device may receive these and other data from a vehicle controller area network (CAN), for example. Geometrical configuration data may particularly comprise dimensions of the vehicle and the trailer.

According to an embodiment of the disclosure, the motor vehicle may be a semi-tractor. The sliding rail may have a lateral sliding rail extension larger than a rolling chassis frame width of the motor vehicle.

Due to the above provision, the kingpin of the trailer engaging the fifth wheel of the vehicle is able to move across the whole rolling chassis frame of the vehicle and even beyond that in order to provide as much flexibility as possible even under very narrow curves, i.e. large steering angles. In one particular example, the sliding rail may have twice the width of the vehicle frame.

According to an embodiment of the disclosure, the lateral sliding rail extension of the sliding rail may be configured such that the fifth wheel is movable at least from a chassis frame rail to a laterally opposite chassis frame rail of the motor vehicle.

Hence, the kingpin of the trailer engaging the fifth wheel of the vehicle is able to move from a centered position in between the chassis frame rails to a position over each respective frame rail.

According to an embodiment of the disclosure, the motor vehicle may be a fuel cell electric vehicle provided with a hydrogen storage (e.g., positioned in a rearward portion of the fuel cell electric vehicle) configured to supply a fuel cell of the motor vehicle with hydrogen.

In this embodiment, the hydrogen storage may be provided, for example, as a rear extension to a tractor unit (or semi-tractor), which may be provided with an increased wheelbase for this purpose. Due to the sliding arrangement of the disclosure, the tractor unit will still be able to pass a turning circle test, even if coupled to an EST.

The disclosure will be explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

Figure 1:
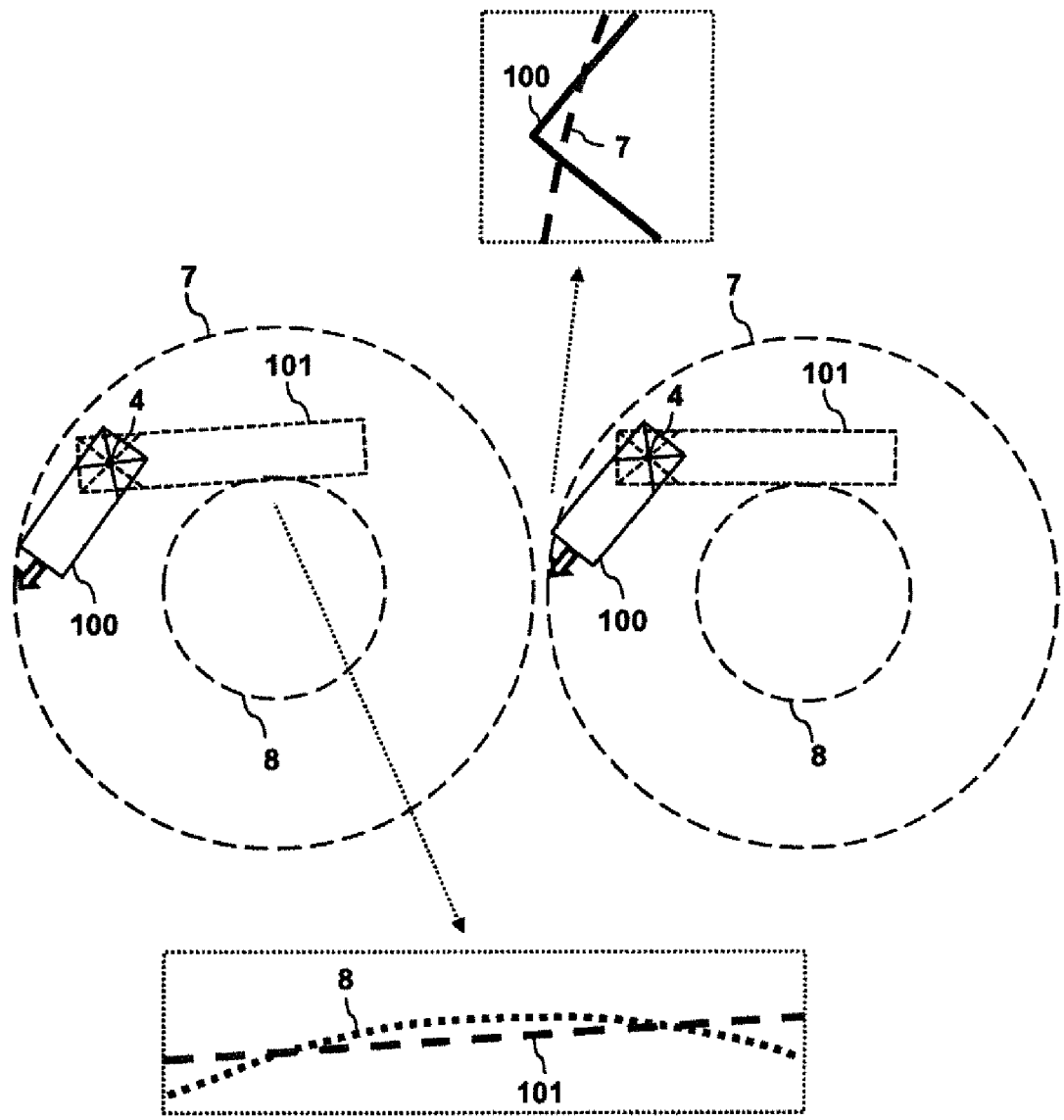
FIG. 1 schematically depicts an example for the turning radius of a motor vehicle towing a trailer.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 schematically depicts an example of a turning radius of a motor vehicle 100 towing a trailer 101.

The motor vehicle 100 and the trailer 101 may form a semi-trailer truck, that is, a tractor unit, truck or other heavy-duty towing engine towing a semi-trailer without front axle for carrying freight. It is to be understood however that the following may equally well be adapted for any other kind of motor vehicle towing a trailer.

The trailer 101 is attached to the motor vehicle 100 with a type of hitch called a fifth wheel 4. The fifth-wheel coupling comprises a kingpin 14 on the trailer side, which may be a vertical steel pin protruding from the bottom of the front of the trailer 101. The fifth wheel 4 itself is a horseshoe-shaped coupling device that is mounted on the rear of the towing vehicle 100. As the connected vehicle 100 turns, the downward-facing surface of the trailer 101 (with the kingpin 14 at the center) rotates against the upward-facing surface of the fixed fifth wheel 4, which does not rotate.

In FIG. 1, the vehicle 100 travels in a circle to the left. In order to comply with certain homologation regulations, the vehicle 100 may have to stay in a cylindrical envelope without exceeding the borderlines of the envelope, that is, it is not allowed to cross an outer turning radius 7 and an inner turning radius 8. If the length of the vehicle 100 and trailer 101 is too long, then it may face problems as exemplified on the left and on the right of FIG. 1. As can be seen in the respective enlarged sections at the top and the bottom of FIG. 1, respectively, the vehicle 100 crosses the respective limits of the cylindrical envelope and hence would not be able to comply with the mentioned requirements.

These problems are overcome by the new coupling approach described below with reference to FIGS. 2 to 5.

Figure 2:
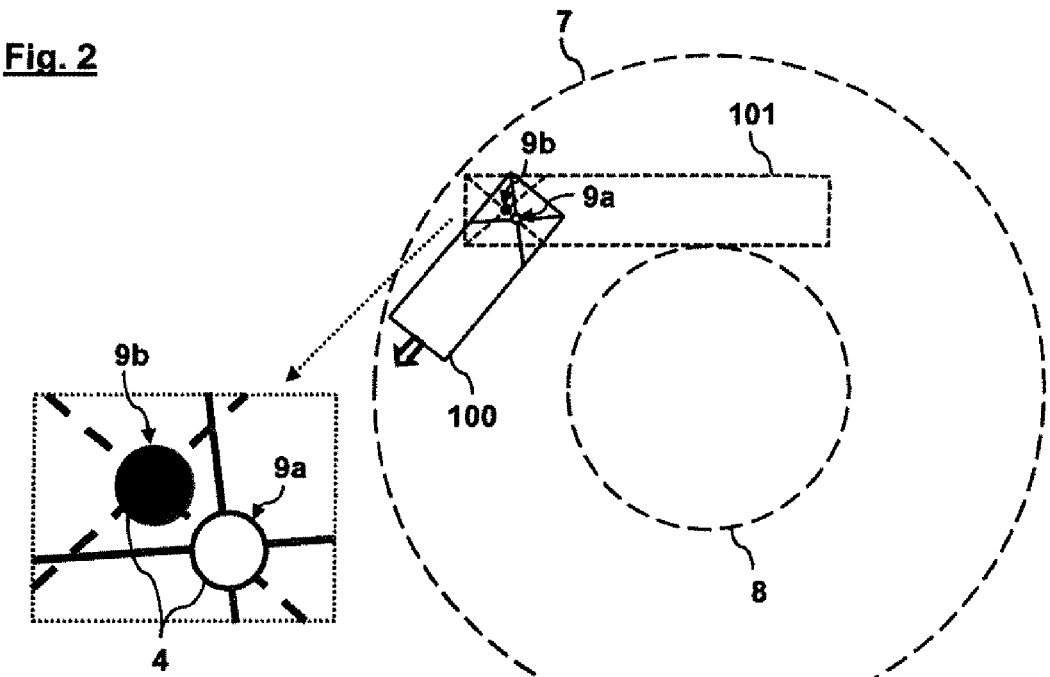
FIG. 2 schematically depicts the towing radius in case that the motor vehicle uses a trailer steering system according to an embodiment of the disclosure.
Figure 3:
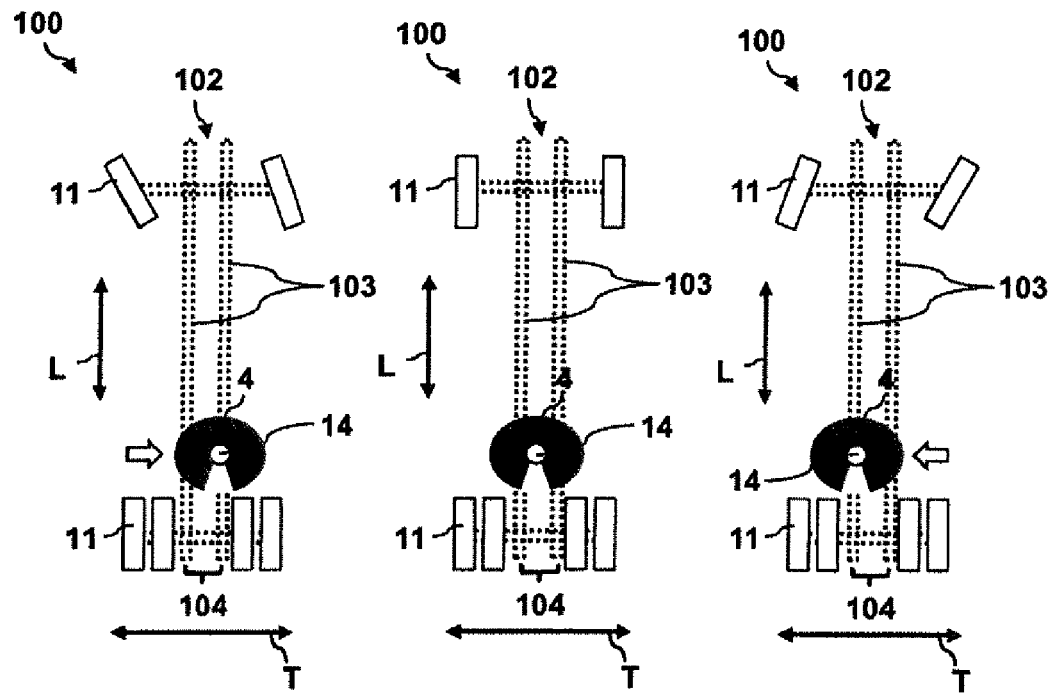
FIG. 3 schematically shows the motor vehicle of FIG. 2 for different steering angles.
Figure 4:
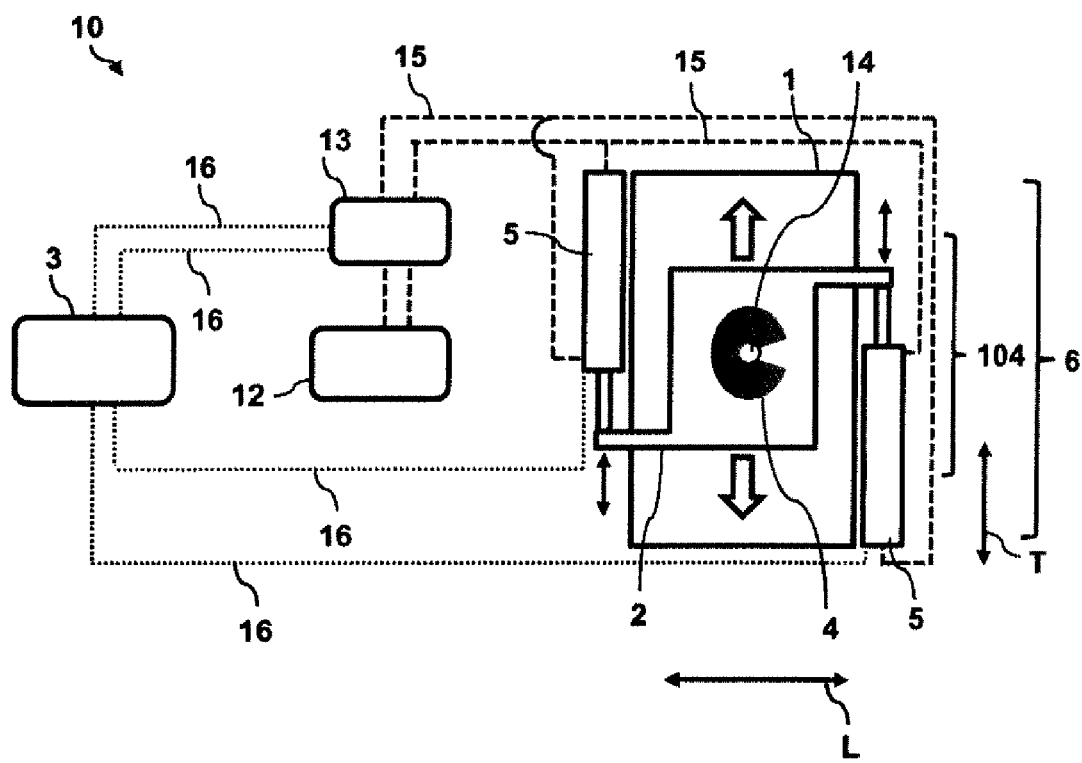
FIG. 4 schematically shows the trailer steering system used in the motor vehicle of FIGS. 2 and 3.
Figure 5:
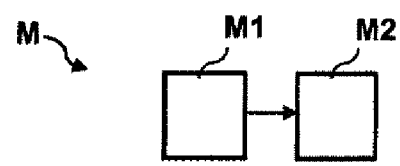
FIG. 5 shows a flow diagram of a method for using the system of FIG. 4.

FIG. 2 schematically depicts the towing radius in case that the vehicle 100 uses a trailer steering system 10 according to an embodiment of the disclosure. FIG. 3 schematically shows the vehicle 100 of FIG. 2 for different steering angles. FIG. 4 schematically depicts the trailer steering system 10 used in the vehicle 100 of FIGS. 2 and 3. FIG. 5 finally is a flow diagram of a method M for using the system 10 of FIG. 4.

The trailer steering system 10 comprises a sliding rail 1 fixedly mounted on a vehicle frame 102 of the vehicle 100 and extending along a lateral direction T of the vehicle 100. The system 10 further comprises a slider 2 slidingly arranged on the sliding rail 1 and carrying a fifth wheel 4 for coupling the trailer 101 to the vehicle 100.

The sliding rail 1 may be a metal part having a lateral sliding rail extension 6 larger than a rolling chassis frame width 104 of the vehicle 100. In particular, the lateral sliding rail extension 6 of the sliding rail 1 may be configured such that the fifth wheel 4 is movable at least from a chassis frame rail 103 to a laterally opposite chassis frame rail 103 of the vehicle 100 (see FIG. 3).

Similarly, also the slider 2 may be a metal component and may be form-fitted to the sliding rail 1 such that relative movement of the slider 2 and the sliding rail 1 is blocked in a longitudinal direction L of the vehicle 100 and a vertical direction of the vehicle 100.

For example, the sliding rail 1 may be provided with two railways, e.g., one in the front and one in the back along the longitudinal direction L (not shown), into which the slider 2 engages at respective front and back portions. As a result, the slider 2 is only movable along the lateral direction T.

The system 10 further comprises a control device 3 configured to control movement of the slider 2 along the sliding rail 1 depending on a current steering angle of the vehicle 100. The control device 3 may be or may be part of an electronic control unit (ECU) or may be communicatively coupled to such a unit. By corresponding control commands of the control device 3, the fifth wheel 4 may thus be moved from one lateral side of the vehicle 100 to the other, as exemplified in FIG. 3. The control device 3 is configured to prompt movement of the slider 2 in a laterally opposite direction with respect to a current steering direction of the vehicle 100. In particular, the slider 2 is moved to the right (right side in FIG. 3) when the vehicle 100 makes a left turn and moved to the left when the vehicle 100 turns right (left side in FIG. 3). In case that the vehicle 100 moves straight, the slider 2 remains in a centered position (middle in FIG. 3).

The corresponding method of FIG. 5 may comprise under M1 assessing the current steering angle of the vehicle 100 with the control device 3 and under M2 controlling movement of the slider 2 along the sliding rail 1 with the control device 3 depending on the current steering angle of the vehicle.

This provision leads to an improved situation compared to the case of FIG. 1, e.g., when a truck with a non-standard length is used in combination with a European Standard Trailer. For example, the vehicle 100 may be a fuel cell electric semi-tractor provided with a hydrogen storage (e.g., positioned in a rearward portion of the fuel cell electric vehicle) configured to supply a fuel cell of the vehicle 100 with hydrogen. The hydrogen storage may be configured as a rear extension of the vehicle 100, thereby increasing overall length and wheelbase of the vehicle 100 (horizontal distance between the centers of the front and rear wheels).

As demonstrated in FIG. 2, the fifth wheel 4 may be moved during the left turn of the vehicle 100 from a center position 9a to a laterally offset position 9b (in this example, laterally offset to the right). As a result, relative position and orientation of vehicle 100 and trailer 101 are changed such that neither the outer turning radius 7 nor the inner turning radius 8 are crossed during the circling maneuver even if the vehicle 100 and the trailer 101 have the same dimensions as the ones depicted in FIG. 1.

To facilitate movement of the slider 2 along the sliding rail 1, two double action hydraulic cylinders 5 are mounted on the sliding rail 1, as shown in FIG. 4. A hydraulic pressure supply 12 and a hydraulic valve 13 are coupled to the hydraulic cylinders 5 via respective hydraulic fluid lines 15. As the hydraulic cylinders 5 are double-acting cylinders 5, both lateral ends of the cylinders 5 are connected via separated lines 15. The hydraulic valve 13 and the cylinders 5 are controlled by the control device 3. It will be understood by one of ordinary skill in the art that the system 10 may additionally comprise a combination of check valves, pumps, filters and/or sensors in order to be able to control the hydraulic cylinders 5 depending on the current steering angle of the vehicle 100.

The control device 3 may continuously monitor and control a lateral position of the slider 2 along the sliding rail 1 depending on the current steering angle of the vehicle 100 (cf. arrows in FIG. 4). The control device 3 may be coupled to corresponding sensors in order to evaluate and assess the real lateral position of the slider 2 at any point in time.

The control device 3 may calculate and set an optimal sliding position of the slider 2 along the sliding rail 1 depending on geometrical configuration data of the vehicle 100 (e.g., wheelbase, front/rear overhang, saddle pre-measure, trailer length, etc.), the vehicle speed of the vehicle 100 and/or the current steering angle of the vehicle. The control device 3 may receive these and other information from CAN-network of the vehicle 100.

For safety reasons, the control device 3 may be configured to block movement of the slider 2 along the sliding rail 1 when the vehicle 100 is stationary (e.g., during parking) or when a vehicle speed of the vehicle 100 is above a threshold speed, e.g., above 30, 40 or 50 km/h. The vehicle 100 may comprise a safety switch or the like within the vehicle cabin for locking the slider 2 in the center position, e.g., for manually switching off the system 10.

As a result, not only is the turning circle decreased for the same vehicle length (or, alternatively, the turning circle does not increase for increased vehicle length). In addition, maneuverability of the vehicle is improved on a general level. Furthermore, loads may be distributed more favorable and thus payload may be upgraded by choosing wheelbase and the further geometric configuration of the vehicle appropriately.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the disclosure and its practical applications, to thereby enable others skilled in the art to utilize the disclosure and various embodiments with various modifications as are suited to the particular use contemplated.

What is claimed is:

1. A trailer steering system for a motor vehicle, comprising:
   a sliding rail mounted on a vehicle frame of the motor vehicle and extending along a lateral direction of the motor vehicle;
   a slider slidingly arranged on the sliding rail and carrying a fifth wheel for coupling a trailer to the motor vehicle; and
   a control device configured to control movement of the slider along the sliding rail depending on a current steering angle of the motor vehicle,
   wherein the control device is configured to calculate and set an optimal sliding position of the slider along the sliding rail depending on geometrical configuration data of the motor vehicle, the vehicle speed of the motor vehicle or the current steering angle of the motor vehicle.

2. The trailer steering system of claim 1, wherein the sliding rail is fixedly mounted on the vehicle frame.

3. The trailer steering system of claim 1, wherein the slider is form-fitted to the sliding rail such that relative movement of the slider and the sliding rail is blocked in a longitudinal direction of the motor vehicle or a vertical direction of the motor vehicle.

4. The trailer steering system of claim 1, further comprising at least one hydraulic cylinder configured to actuate sliding movement of the slider along the sliding rail.

5. The trailer steering system of claim 4, wherein the at least one hydraulic cylinder is configured as a double-acting hydraulic cylinder.

6. The trailer steering system of claim 4, wherein the at least one hydraulic cylinder is mounted on the sliding rail.

7. The trailer steering system of claim 1, further comprising at least one screw drive configured to actuate sliding movement of the slider along the sliding rail.

8. The trailer steering system of claim 1, wherein the control device is configured to prompt movement of the slider in a laterally opposite direction with respect to a current steering direction of the motor vehicle.

9. The trailer steering system of claim 1, wherein the control device is configured to block movement of the slider along the sliding rail when the motor vehicle is stationary or when a vehicle speed of the motor vehicle is above a threshold speed.

10. A motor vehicle comprising the trailer steering system of claim 1.

11. The motor vehicle of claim 10, wherein the motor vehicle is a semi-tractor, wherein the sliding rail has a lateral sliding rail extension larger than a rolling chassis frame width of the motor vehicle.

12. The motor vehicle of claim 11, wherein the lateral sliding rail extension of the sliding rail is configured such that the fifth wheel is movable at least from a chassis frame rail to a laterally opposite chassis frame rail of the motor vehicle.

13. The motor vehicle of claim 10, wherein the motor vehicle is a fuel cell electric vehicle provided with a hydrogen storage configured to supply a fuel cell of the motor vehicle with hydrogen.

14. A method for steering a trailer coupled to a fifth wheel of a motor vehicle, wherein the fifth wheel is arranged on top of a slider being slidingly arranged on a sliding rail, the sliding rail being mounted on a vehicle frame of the motor vehicle and extending along a lateral direction of the motor vehicle, the method comprising:
   assessing, by a control device, a current steering angle of the motor vehicle; and
   controlling, by the control device, movement of the slider along the sliding rail depending on the current steering angle of the motor vehicle,
   wherein the control device calculates and sets an optimal sliding position of the slider along the sliding rail depending on geometrical configuration data of the motor vehicle, the vehicle speed of the motor vehicle or the current steering angle of the motor vehicle.

15. The method of claim 14, wherein the control device prompts movement of the slider in a laterally opposite direction with respect to a current steering direction of the motor vehicle.

16. The method of claim 14, wherein the control device blocks movement of the slider along the sliding rail when the motor vehicle is stationary or when a vehicle speed of the motor vehicle is above a threshold speed.

17. A motor vehicle comprising:
   a trailer steering system comprising:
      a sliding rail mounted on a vehicle frame of the motor vehicle and extending along a lateral direction of the motor vehicle;
      a slider slidingly arranged on the sliding rail and carrying a fifth wheel for coupling a trailer to the motor vehicle; and
      a control device configured to control movement of the slider along the sliding rail depending on a current steering angle of the motor vehicle,
   wherein the motor vehicle is a semi-tractor, wherein the sliding rail has a lateral sliding rail extension larger than a rolling chassis frame width of the motor vehicle.

18. The motor vehicle of claim 17, wherein the lateral sliding rail extension of the sliding rail is configured such that the fifth wheel is movable at least from a chassis frame rail to a laterally opposite chassis frame rail of the motor vehicle.

19. The motor vehicle of claim 17, wherein the motor vehicle is a fuel cell electric vehicle provided with a hydrogen storage configured to supply a fuel cell of the motor vehicle with hydrogen.

* * * * *